US012562888B2

(12) United States Patent　　(10) Patent No.: US 12,562,888 B2
Vedula et al.　　(45) Date of Patent: Feb. 24, 2026

(54) SYSTEMS AND METHODS FOR ENCRYPTING AND TRANSMITTING DATA BETWEEN DEVICES

(71) Applicant: Apple Inc., Cupertino, CA (US)

(72) Inventors: Srinivas Vedula, Pleasanton, CA (US); Qihe Wang, San Jose, CA (US); Kyle C. Brogle, San Francisco, CA (US); Frederic Jacobs, St. Sulpice (CH); Yannick L. Sierra, San Francisco, CA (US); Giuliano Pasqualotto, Los Altos, CA (US); Anup Rathi, Milpitas, CA (US); Duncan A. McRoberts, Boulder, CO (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 18/396,603

(22) Filed: Dec. 26, 2023

(65) Prior Publication Data

US 2024/0214182 A1　　Jun. 27, 2024

Related U.S. Application Data

(60) Provisional application No. 63/477,362, filed on Dec. 27, 2022.

(51) Int. Cl.
　　*H04L 9/08*　　　(2006.01)
　　*G06Q 30/06*　　(2023.01)
(52) U.S. Cl.
　　CPC .......... *H04L 9/0825* (2013.01); *G06Q 30/06* (2013.01)
(58) Field of Classification Search
　　None
　　See application file for complete search history.

(56) References Cited

U.S. PATENT DOCUMENTS

| | | | |
|---|---|---|---|
| 10,739,850 B2 | 8/2020 | Stafford et al. | |
| 11,269,406 B1 * | 3/2022 | Sztuk ................. | G02B 27/0093 |
| 2016/0317025 A1 * | 11/2016 | Lee ..................... | A61B 5/0022 |
| 2019/0056780 A1 | 2/2019 | Bombard et al. | |

FOREIGN PATENT DOCUMENTS

| | | |
|---|---|---|
| CN | 209842236 U | 12/2019 |
| EP | 2341481 A1 | 7/2011 |
| GB | 2557569 A | 3/2018 |
| WO | 2022157195 A1 | 7/2022 |

OTHER PUBLICATIONS

International Search Report received for PCT Patent Application No. PCT/US2023/085945, mailed on Mar. 19, 2024, 18 Pages.

* cited by examiner

*Primary Examiner* — Bassam A Noaman
(74) *Attorney, Agent, or Firm* — Kubota & Basol LLP

(57) ABSTRACT

Encrypting and securely transmitting data between devices is disclosed. After a device obtains a request to purchase a prescription lens, including prescription data, to be inserted into a second electronic device, the prescription data is securely encrypted and transmitted to the lens manufacturer. The lens manufacturer may create a prescription lens and calibration data related to the lens. The calibration data can be encrypted and transmitted to a storage device for storage. The second electronic device can retrieve the encrypted calibration data from the storage device and utilize it to perform a full calibration of the device. The second electronic device can present images, in accordance with the calibration data, using a display through an optical path that include the prescription lens.

20 Claims, 7 Drawing Sheets

300

400

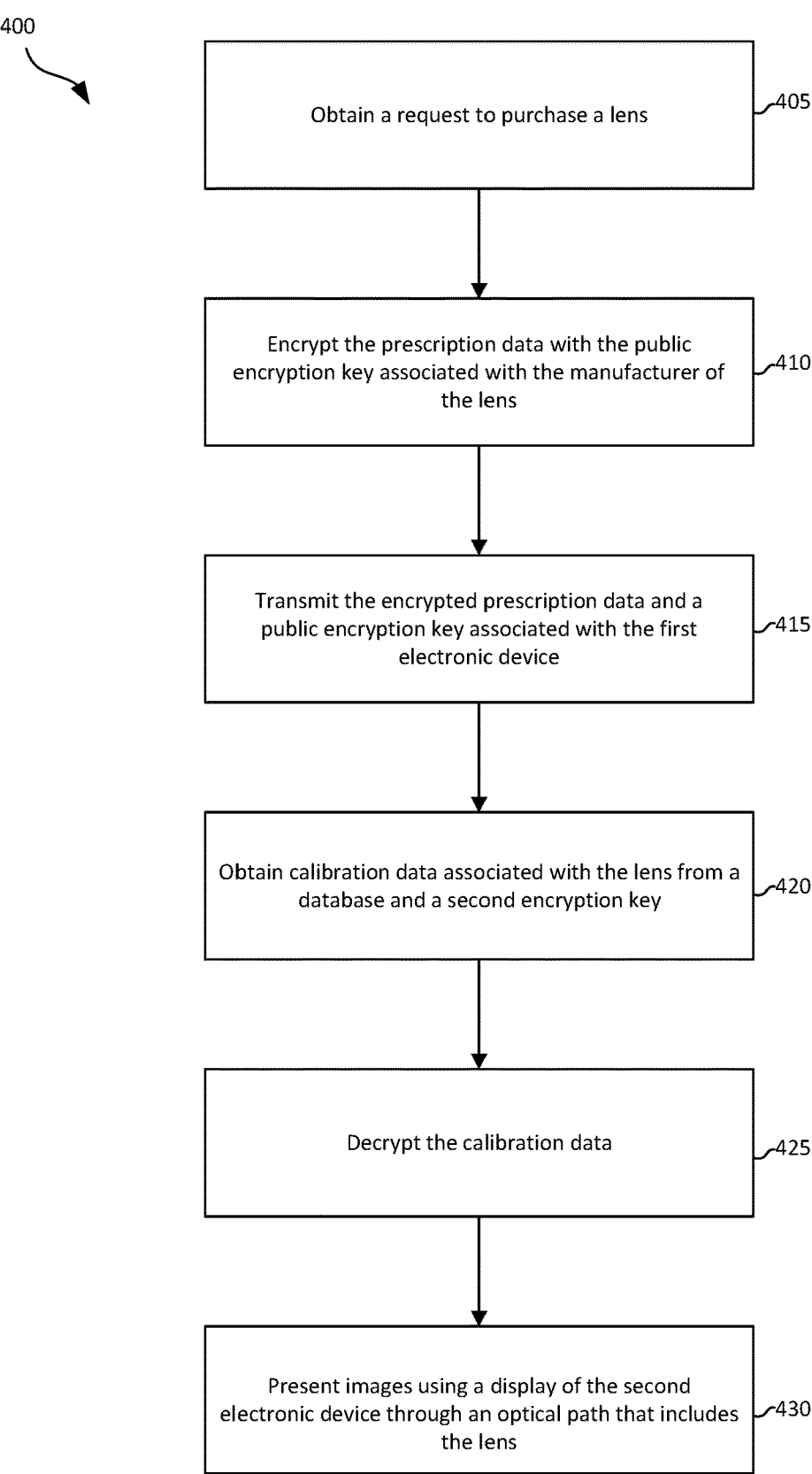

Obtain a request to purchase a lens    405

Encrypt the prescription data with the public encryption key associated with the manufacturer of the lens    410

Transmit the encrypted prescription data and a public encryption key associated with the first electronic device    415

Obtain calibration data associated with the lens from a database and a second encryption key    420

Decrypt the calibration data    425

Present images using a display of the second electronic device through an optical path that includes the lens    430

SYSTEMS AND METHODS FOR ENCRYPTING AND TRANSMITTING DATA BETWEEN DEVICES

CROSS-REFERENCE TO RELATED APPLICATIONS

This application claims the benefit of U.S. Provisional Application No. 63/477,362, filed Dec. 27, 2022, the content of which is herein incorporated by reference in its entirety for all purposes.

FIELD OF THE DISCLOSURE

This relates generally to systems and methods for encrypting and transmitting data between devices, and more particularly to ensuring that data can be securely transmitted between devices and decrypted at a subset of the devices.

BACKGROUND OF THE DISCLOSURE

Device accessories such as prescription lenses provide vision correction and enhance the user experience when utilized within an optical system. Ordering prescription lenses requires information about the lenses with the manufacturer to properly manufacture prescription lenses and using the prescription lenses may require information about the lenses from the manufacturer.

SUMMARY OF THE DISCLOSURE

This relates to systems and methods for encrypting and transmitting data (e.g., prescription data, calibration data). Encryption can be used by devices to ensure that data including information associated with prescription lenses is accessed by authorized users and devices. In some embodiments, some of the data (e.g., prescription data) is encrypted using a public key of the lens manufacturer and/or some of the data (e.g., calibration data and/or prescription data) may be encrypted using a public key and decrypted using a private key of the public/private key pair associated with a user's device. In some embodiments, a first electronic device receives a request to purchase a prescription lens configured to be inserted into a second electronic device. In some embodiments, a request to purchase a prescription lens includes prescription data such as optometric data and a public encryption key associated with the first electronic device. The prescription data may be encrypted using the public encryption key associated with the manufacturer of the prescription lens. In some embodiments, a public encryption key associated with the first electronic device is also encrypted using the public encryption key associated with the lens manufacturer. In some embodiments, the encrypted prescription data and/or the encrypted public key associated with the first electronic device is transmitted to the lens manufacturer. The lens manufacturer may decrypt the prescription data and/or the encrypted public key associated with the first electronic device using a private key associated with the lens manufacturer, and then use the prescription data to manufacture the prescription lens. The lens manufacturer can also generate calibration data for the prescription lens. In some embodiments, the lens manufacturer encrypts the calibration data with the public key associated with the first electronic device and transmit the encrypted calibration data to a storage location in a storage device. The lens manufacturer may also send the prescription lens to a user to be used in a second electronic device.

In some embodiments, and in accordance with an insertion of the prescription lens into the second electronic device, the second electronic device obtains the encrypted calibration data from the storage device. Then, the second electronic device may decrypt the calibration data using a second encryption key (e.g., the private encryption key associated with the first electronic device). In some embodiments, the second electronic device presents images using a display through an optical path that includes the prescription lens.

In some embodiments, the lens manufacturer encrypts the calibration data with a unique key (e.g., secret key generated by the lens manufacturer). In some embodiments, the lens manufacturer transmits the secret key to the user using a label. The user can decrypt the calibration data using the secret key using the second electronic device. In some embodiments, the user uses the first electronic device to decrypt the calibration data using the secret key.

In some embodiments, a storage device stores encrypted calibration data of a prescription lens in a database including a plurality of calibration data for a plurality of lenses. Encrypted calibration data may be stored at a specific storage location associated with an identifier of the second electronic device, the second encryption key, or a combination of both. In some embodiments, the storage device transmits the encrypted calibration data from the storage device to the second electronic device when requested.

The full descriptions of these examples are provided in the Drawings and the Detailed Description, and it is understood that this Summary does not limit the scope of the disclosure in any way.

BRIEF DESCRIPTION OF THE DRAWINGS

FIG. 4 illustrates an example flowchart of a method for encrypting and securely transferring data according to some embodiments of the disclosure.

DETAILED DESCRIPTION

Figure 1:
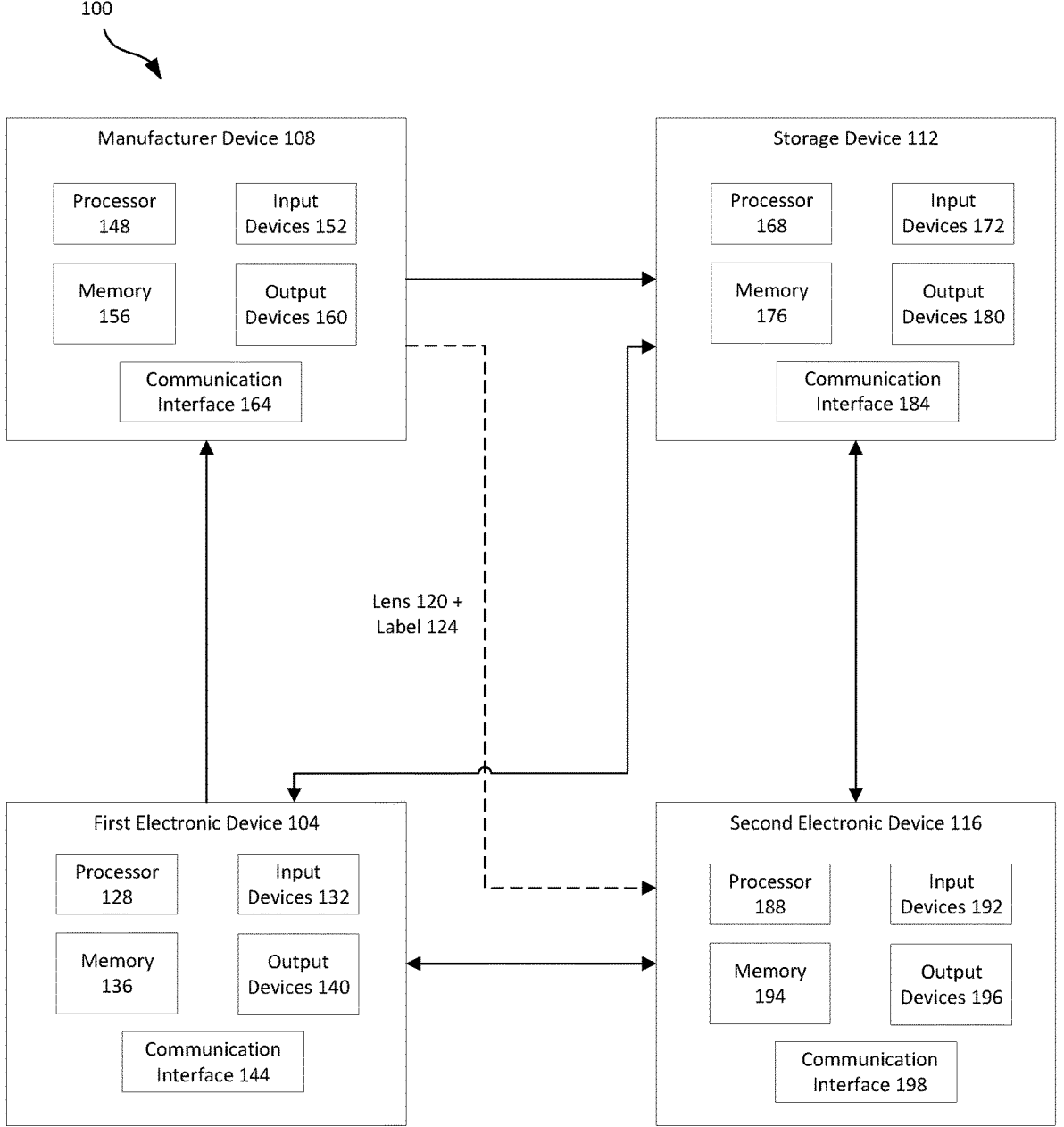
FIG. 1 illustrates a block diagram of an exemplary system for encrypting and transferring data between devices according to some embodiments of the disclosure.

In the following description of embodiments, reference is made to the accompanying drawings which form a part hereof, and in which it is shown by way of illustration specific embodiments that can be practiced. It is to be understood that other embodiments can be used, and structural changes can be made without departing from the scope of the disclosed embodiments.

This relates to systems and methods for encrypting and transmitting data (e.g., prescription data, calibration data).

Encryption can be used by devices to ensure that data including information associated with prescription lenses is accessed by authorized users and devices. In some embodiments, some of the data (e.g., prescription data) is encrypted using a public key of the lens manufacturer and/or some of the data (e.g., calibration data and/or prescription data) may be encrypted using a public key and decrypted using a private key of the public/private key pair associated with a user's device. In some embodiments, a first electronic device receives a request to purchase a prescription lens configured to be inserted into a second electronic device. In some embodiments, a request to purchase a prescription lens includes prescription data such as optometric data and a public encryption key associated with the first electronic device. The prescription data may be encrypted using the public encryption key associated with the manufacturer of the prescription lens. In some embodiments, a public encryption key associated with the first electronic device is also encrypted using the public encryption key associated with the lens manufacturer. In some embodiments, the encrypted prescription data and/or the encrypted public key associated with the first electronic device is transmitted to the manufacturer. The manufacturer may decrypt the prescription data and/or the encrypted public key associated with the first electronic device using a private key associated with the lens manufacturer, and then use the prescription data to manufacture the prescription lens. The manufacturer can also generate calibration data for the prescription lens. In some embodiments, the manufacturer encrypts the calibration data with the public key associated with the first electronic device and transmit the encrypted calibration data to a storage location in a storage device. The manufacturer may also send the prescription lens to a user to be used in a second electronic device. In some embodiments, and in accordance with an insertion of the prescription lens into the second electronic device, the second electronic device obtains the encrypted calibration data from the storage device. Then, the second electronic device may decrypt the calibration data using a second encryption key (e.g., the private encryption key associated with the first electronic device). In some embodiments, the second electronic device presents images using a display through an optical path that includes the prescription lens.

In some embodiments, the lens manufacturer encrypts the calibration data with a unique key (e.g., secret key generated by the lens manufacturer). In some embodiments, the lens manufacturer transmits the secret key to the user using a label. The user can decrypt the calibration data using the secret key using the second electronic device. In some embodiments, the user uses the first electronic device to decrypt the calibration data using the secret key.

In some embodiments, a storage device stores encrypted calibration data of a prescription lens in a database including a plurality of calibration data for a plurality of lenses. Encrypted calibration data may be stored at a specific storage location associated with an identifier of the second electronic device, the second encryption key, or a combination of both. In some embodiments, the storage device transmits the encrypted calibration data from the storage device to the second electronic device when requested.

FIG. 1 illustrates an exemplary hardware block diagram 100 for a system for encrypting and securely transferring data. Block diagram 100 includes a first electronic device 104 which may be communicatively coupled to a manufacturer device 108, a storage device 112, and/or a second electronic device 116. Manufacturer device 108 may be communicatively coupled to storage device 112. Storage device 112 may be communicatively coupled to first electronic device 104 and/or second electronic device 116. Second electronic device 116 may be communicatively coupled to storage device 112 and/or first electronic device 104. Communications between devices are discussed in further detail in FIGS. 2 and 3. In some embodiments, first electronic device 104 and second electronic device 116 are designed and/or manufactured by the same device manufacturer. Additionally or alternatively, first electronic device 104 and second electronic device 116 may include operating systems and applications from the same software company (e.g., optionally the same company as the device manufacturer). The device manufacturer for the first electronic device 104 and the second electronic device 116 may be different than the lens manufacturer associated with manufacturer device 108.

In some embodiments, the first electronic device 104 is a smart phone, a tablet computer, a laptop computer, a desktop computer, or any other suitable portable or non-portable electronic device. In some embodiments, the second electronic device 116 is a wearable device including an optical system such as a head-mounted device into which a prescription lens can be inserted. In some embodiments, the user of first electronic device 104 and of second electronic device 116 are the same user. In some embodiments, the manufacturer device 108 is a smart phone, a tablet computer, a laptop computer, desktop computer, or any other suitable portable or non-portable electronic device. In some embodiments, the storage device 112 is a data server (e.g., cloud storage or other remote storage). It is understood that the above electronic devices are examples, but first electronic device 104, second electronic device 116, manufacturer device 108, and storage device 112 can be implemented using any suitable electronic device providing the functionality described herein.

In some embodiments, first electronic device 104, manufacture device 108, storage device 112, and/or second electronic device 116 each include one or more processors 128, 148, 168, 188, one or more memories 136, 156, 176, 194, one or more input devices 132, 152, 172, 192 (e.g., touch sensor panels, touch screens, trackpads, buttons, joysticks, microphones, cameras, sensors, etc.), one or more output devices 140, 160, 180, 196 (e.g., displays, speakers, tactile feedback generators, etc.), and one or more communication interfaces 144, 164, 184, 198 (wired or wireless communication circuitry, such as Bluetooth, WiFi, cellular, etc.). In some embodiments, communication interfaces 144, 164, 184, 198 are used for electronic communication between devices as described herein and in reference to FIG. 2 and FIG. 3. One or more communication buses not shown in FIG. 1 can optionally be used for communication between the aforementioned components within each device.

In some embodiments, processors 128, 148, 168, 188 includes one or more general purpose processors, one or more graphics processors, one or more digital signal processors (DSPs), microcontrollers, field programmable gate arrays, programmable logic devices, and/or the like configured for performing the operations described herein. In some embodiments, some or all of memories 136, 156, 176, 194 includes a non-transitory computer-readable storage medium (e.g., flash memory, random access memory, or other volatile or non-volatile memory or storage) that stores computer-readable instructions or programs configured to be executed by processors 128, 148, 168, 188 to perform the techniques, processes, and/or methods described herein. In some embodiments, memory 136, 156, 176, 194 includes a non-transitory computer-readable storage medium. As used herein, a "non-transitory computer-readable storage medium" includes any tangible medium (e.g., excluding signals) that can contain or store programs/instructions for use by the electronic device (e.g., processing circuitry), for example. The non-transitory computer-readable storage medium can include, but is not limited to, magnetic, optical, and/or semiconductor storage. Examples of such storage include magnetic disks, optical discs based on CD, DVD, or Blu-ray technologies, as well as persistent solid-state memory such as flash, solid-state drives, and the like.

In some embodiments, output devices 140, 160, 180, 196 optionally include a display. A display can include a single display (e.g., a liquid-crystal display (LCD), organic light-emitting diode (OLED), or other types of display). In some embodiments, a display includes multiple displays. In some embodiments, a display includes a display with a touch-sensitive surface (e.g., a touch screen). In some devices (e.g., the second electronic device 116), the display can include a projector, a holographic projector, a retinal projector, etc.

FIG. 1 illustrates example architectures for first electronic device 104, second electronic device 116, manufacturer device 108 and storage device 112. However, it is understood that one or more of these devices optionally include fewer, more, or different components than shown in FIG. 1.

In addition to the device communications described and illustrated in FIG. 1, FIG. 1 also illustrates the provision of a prescription lens 120 and/or a label 124 that is physically transmitted from the lens manufacturer associated with a manufacturer device 108 to a user of the prescription lens and/or of second electronic device 116. For example, a lens manufacturer associated with manufacturer device 108 may manufacture the prescription lens 120 (e.g., using prescription data) and/or label 124, and may send (e.g., by mail, carrier, or the like) prescription lens 120 and/or label 124 to the user (e.g., to an address associated with the user of the prescription lens 120 and/or second electronic device 116. Alternatively, in some embodiments, prescription lens 120 and/or label 124 are picked up by a user of second electronic device 116 from the lens manufacturer. In other examples, prescription lens 120 and/or label 124 is provided to or obtained by the user together. In some embodiments, the prescription lens 120 and label 124 are separately provided to or obtained by the user. For example, prescription lens 120 can be picked up or shipped to the user and label 124 is mailed, electronically emailed, electronically messaged, downloaded, or the like, from the internet or otherwise received or retrieved by the user of the first electronic device 104 or the second electronic device 116.

As described herein, prescription data is used to manufacture prescription lens 120. After manufacture, prescription lens 120 can be characterized by the manufacturer to capture the accurate surface profiles of the lenses (two surfaces for each prescription lens). In some embodiments, these characterizations of the lens are provided to calibrate the optical system of the electronic device using the prescription lens (e.g., second electronic device 116). These characterizations are referred to as calibration data. In some embodiments, these characterizations are used to generate other data referred to as calibration data. The calibration data is provided by the manufacturer device 108 (e.g., uploaded) or otherwise saved at storage device 112, from which is the data is available for later access over communications channels (e.g., wireless and/or wired communications channels and networks).

Encryption and decryption methods may be used to safeguard prescription data and calibration data. For example, encrypting data at the first electronic device to communicated to the manufacturer can prevent access to the data by those other than the requestor of the prescription lens and the lens manufacturer. Likewise, encrypting data at the manufacturer electronic device to communicated to the storage device can prevent access to the data by those other than the requestor of the prescription lens and/or the lens manufacturer. Encryption methods may be used to prevent unauthorized users and devices from viewing and/or accessing data during the transfer and/or storage of data.

In some embodiments, label 124 is an optical or visual label or marker that can include a radial or rectangular two-dimensional pattern or array of bars (of the same or different lengths) or squares that are optically distinguishable from each other or from a background. The bars, squares and/or background representing the digital computer-recognizable code of label 124 can be formed with at least two distinguishable colors, shades, reflectivity, and the like, and can optionally include logos, version and format information, data and error correction keys, and position, alignment, and timing patterns. In other embodiments, label 124 can be inclusive of other types of computer-readable elements such as magnetic stripes that are readable by a magnetic reader. In some embodiments, label 124 stores calibration data and/or prescription data. Label 124 can be scanned by first electronic device 104 and/or by second electronic device 116 to extract calibration data and/or prescription data. Second electronic device 116 performs an initial calibration of the optical system, which can enable improved (optionally optimized) visual performance and improved (optionally optimized) accuracy of operations that utilize the prescription lens 120. In some embodiments, label 124 stores other data such as an identifier associated with prescription lens 120, an encryption key, and/or a storage location, discussed in further detail with respect to FIGS. 2 and 3.

Figure 2:
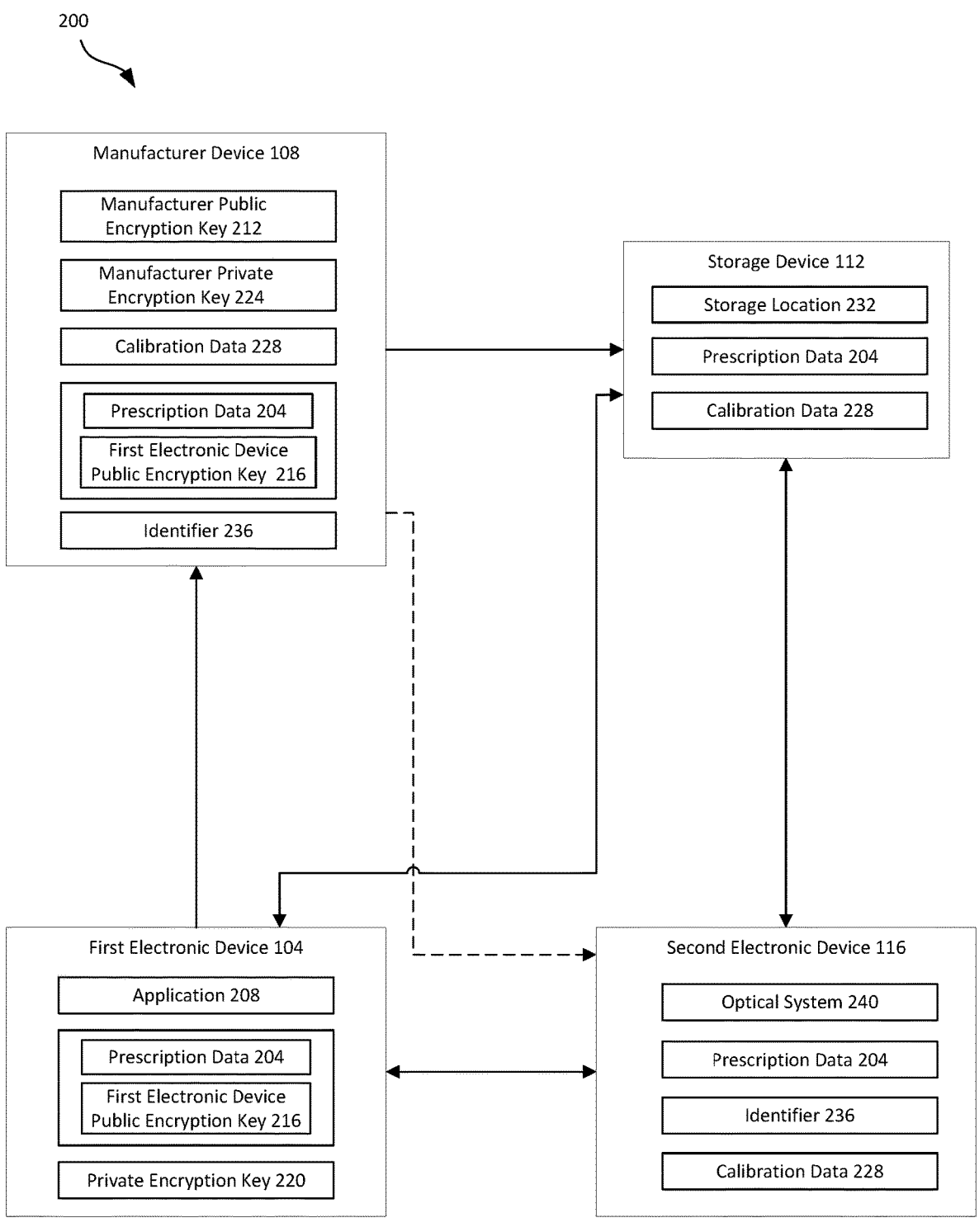
FIG. 2 illustrates an exemplary flow diagram for a system for encrypting and securely transferring data according to some embodiments of the disclosure.

FIG. 2 illustrates an exemplary flow diagram 200 for a system for encrypting and securely transferring data for prescription lenses according to some embodiments of the disclosure. In the example of FIG. 2, prescription data 204 can be entered into first electronic device 104. As discussed in FIG. 1, prescription data 204 is used to manufacture the prescription lens. In some embodiments, prescription data 204 includes optometric data. Prescription data 204 may be inputted in an application 208 executed on first electronic device 104. In some embodiments, application 208 includes software designed for a user to input prescription data 204 to be used to make prescription lenses. For example, application 208 is used to purchase second electronic device 116 from the manufacturer of second electronic device 116. In some embodiments, application 208 provides a user interface for ordering accessories for second electronic device 116, such as a prescription lens. In some embodiments, a user designates a lens manufacturer (e.g., out of a plurality of lens manufacturers) to transmit prescription data 204 to manufacture the prescription lens. In some embodiments, there is only one manufacturer that manufactures prescription lenses. In some embodiments, first electronic device 104 and/or application 208 determines a manufacturer to transmit prescription data 204 to manufacture the prescription lens without user selection. In some embodiments, application 208 stores or obtains one or more public encryption key 212 respectively associated with each of one or more lens manufacturers. Before transmitting the prescription data 204 to manufacturer device 108, application 208 encrypts prescription data 204 with the public encryption key 212 associated with the lens manufacturer to which the prescription data 204 is transmitted. In some embodiments, prescription data 204 may be encrypted by first electronic device 104 rather than by application 208.

In some embodiments, first electronic device 104 includes a public encryption key 216 and a private encryption key 220. In some embodiments, the public/private key pair is generated by the first electronic device 104, optionally responsive to a request to purchase the prescription lens.

In some embodiments, public encryption key 216 associated with first electronic device 104 is also transmitted to manufacturer device 108. In some embodiments, public encryption key 216 associated with the first electronic device is also encrypted using public encryption key 212 associated with the lens manufacturer. In some embodiments, public encryption key 216 and prescription data 204 are encrypted together with public encryption key 212 associated with the lens manufacturer and transmitted together to the lens manufacturer. In some embodiments, public encryption key 216 associated with the first electronic device and prescription data 204 are encrypted with public encryption key 212 associated with the lens manufacturer separately (or optionally different public encryption keys associated with the lens manufacturer) and/or transmitted separately to the lens manufacturer.

Once encrypted, as represented by closed lock in FIG. 2, prescription data 204 and/or public encryption key 216 associated with the first electronic device are transmitted to the lens manufacturer. After receiving the encrypted prescription data and public encryption key associated with first electronic device 104, the manufacture device 108 decrypts the prescription data 204 and public encryption key 216 associated with the first electronic device. Manufacturer device 108 can use a private encryption key 224 associated with the lens manufacturer corresponding to the public encryption key associated with the lens manufacturer (e.g., a public/private key pair associated with the lens manufacturer) to decrypt prescription data 204 and public encryption key 216 associated with the first electronic device. As described herein, the prescription data 204 is used to manufacture the prescription lens, and optionally the prescription data 204 and/or calibration data 228 are encrypted using public encryption key 216 associated with the first electronic device.

In some embodiments, a manufactured prescription lens has a unique identifier 236 associated with the lens (e.g., each manufactured prescription lens can have a unique identifier 236). The unique identifier 236 and the associated prescription lens are known to the lens manufacturer at the time of manufacture to encrypt and/or store data on storage device 112. The unique identifier 236 and the associated prescription lens are known to the lens manufacturer in order to enable shipping the prescription lens and unique identifier 236 to the user of the prescription lens. The unique identifier can be attached to the prescription lens. For example, the unique identifier may be engraved (e.g., laser etched) or separately attached (e.g., a sticker) onto the prescription lens. In other examples, the unique identifier may be attached in the form of an electronic tag, such as a near-field communication (NFC) tag. In other examples, the unique identifier may be represented as a radial or rectangular two-dimensional pattern or array of bars (of the same or different lengths) or squares that are optically distinguishable from each other or from a background. In some embodiments, identifier 236 is determined by the manufacturer device 108 (e.g., generated by the lens manufacturer, optionally using identifier generating software provided by the software company associated with application 208, first electronic device 104 and/or second electronic device 116, but with the software company unaware of the association with the prescription lens). In some embodiments, identifier 236 is determined at the first electronic device 104, such as when a user submits a request for a prescription lens (e.g., using application 208), and the identifier can be encrypted and sent to the lens manufacturer in a similar manner as the prescription data.

After manufacture, calibration data 228 can be generated using surface profiles of the prescription lens. Calibration data 228 can include parameterized surface profile data that describe the surface profiles of the prescription lens. Calibration data 228 is optionally used to improve (e.g., optionally optimize) visual performance and accuracy in operations that utilize the prescription lens (e.g., eye tracking, distortion correction, chromatic aberration correction, etc.).

As illustrated in FIG. 2, prescription data 204 and/or calibration data 228 are encrypted as represented by closed locks in FIG. 2 prior to storing prescription data 204 and/or calibration data 228 on storage device 112. In some embodiments, prescription data 204 and/or calibration data 228 are encrypted at the manufacture device 108 using the public encryption key 216 associated with the first electronic device 104 that was transmitted from the first electronic device 104 to the manufacturer device 108.

As shown in FIG. 2, encrypted calibration data 228 is transmitted by the manufacturer device 108 to a storage location 232 in storage device 112. In some embodiments, encrypted prescription data 204 is also transmitted to storage location 232 in storage device 112 by manufacturer device 108. In other embodiments, prescription data 204 may be extrapolated from calibration data 228, such that prescription data 204 does not need to be transmitted as well. In some embodiments, storage device 112 includes a database. The database may include a plurality of calibration data for a plurality of prescription lenses (e.g., for a plurality of different users). In some embodiments, to determine storage location 232 in storage device 112 at which to store the encrypted prescription data 204 and/or calibration data 228, a hash value is generated by the manufacturer device 108, optionally using a hashing and/or encryption function. The hashing and/or encryption function may be a repeatable process such that identical input data may produce identical output hashes each time they are subjected to the same hashing and/or encryption function. This function may also be a one-way function such that the hash value produced cannot be reconstructed into the original data. The hash value may be a unique value corresponding to the data to be stored (e.g., calibration data, prescription data, etc.). The hash value is optionally generated using identifier 236 (e.g., a serial number) of the prescription lens and/or public encryption key 216 associated with the first electronic device 104. In some embodiments, identifier 236 and public encryption key 216 associated with the first electronic device 104 are concatenated or otherwise combined as inputs to the hashing function.

In some embodiments, second electronic device 116 requests prescription data 204 and/or calibration data 228 from storage device 112. In some embodiments, second electronic device 116 requests prescription data 204 and/or calibration data 228 using the label 124 transmitted from the lens manufacturer to the user of second electronic device 116, as discussed with respect to FIG. 1. In some embodiments, the label includes storage location 232 of the prescription data 204 and/or calibration data 228. In some embodiments, the label includes identifier 236 and/or public encryption key 216 associated with the first electronic device, which may be hashed at the second electronic device 116 to generate the hash value of storage location 232.

In some embodiments, a user uses second electronic device 116 to scan the label. In some embodiments, scanning the label includes using a camera of the one or more input devices 192 (e.g., an outward facing camera). In some embodiments, second electronic device 116 uses a camera of optical system 240 to scan the label. In some embodiments, scanning the label includes using near field communications to scan the label. For example, a label including a radio-frequency identification (RFID) or NFC tag that may be scanned by second electronic device 116 using an RFID or NFC receiver. The RFID or NFC receiver may be one of input devices 132 or 192. In other embodiments, first electronic device 104 scans the label using the systems and methods discussed above and optionally subsequently transmits to second electronic device 116. The request for prescription data 204 and/or calibration data 228 is optionally transmitted from first electronic device 104 to second electronic device 116 using wireless or wired transmission.

Scanning the label and obtaining prescription data 204 and/or calibration data 228 may be done in accordance with an insertion of the prescription lens into the second electronic device 116. In some embodiments, scanning the label and obtaining data occur after the prescription lens is inserted into the second electronic device 116 (e.g., triggered in response to insertion). Insertion of the prescription lens can include clipping on, inserting, or otherwise attaching or functionally coupling the prescription lens with the second electronic device 116. In other embodiments, cameras or other image sensors on the second electronic device 116, or cameras or other image sensors on devices separate from second electronic device 116, but communicatively coupled to the second electronic device 116 (e.g., first electronic device 104), can be used to scan the label. In some embodiments, scanning the label triggers the request. In some embodiments, the request is only triggered after insertion of the prescription lens.

As described herein, in some embodiments, second electronic device 116 generates a hash value to retrieve the encrypted prescription and/or calibration data. The hash value is optionally generated using the same hashing and/or encrypting function used by manufacturer device 108 in a similar manner as described above for storage of the encrypted prescription and/or calibration data. As a result, the hash value generated is consistent with the hash value generated by the manufacturer device 108 to enable accessing the correct storage location 232.

Encrypted prescription data 204 and/or calibration data 228 obtained by second electronic device 116 is optionally decrypted by the second electronic device 116 as indicated by the open locks in FIG. 2. Encrypted prescription data 204 and/or calibration data 228 are optionally decrypted using the private encryption key 220 associated with the first electronic device 104 (e.g., of the public/private key pair of the first electronic device 104).

In some embodiments, public encryption key 216 associated with the first electronic device 104 and/or private encryption key 220 associated with the first electronic device 104 is transmitted to the second electronic device 116. In some embodiments, transmission of the keys includes using wireless transmission (e.g., Wi-Fi, Bluetooth, or near field communications). In some embodiments, wireless transmission of the keys is in accordance with detecting contact between the first electronic device 104 and the second electronic device 116. For example, contact may include a "tap" as seen by an accelerometer in either first electronic device 104 or in second electronic device 116. In some embodiments, contact includes contact wherein the wireless communication of both devices is in range of each other. In some embodiments, detecting contact includes detecting proximity within a threshold distance between the devices. For example, first electronic device 104 may be detected as being within 0.1, 0.2, 0.3, 0.4, 0.5, 0.6, 0.7, 0.8, 0.9, or 1.0 meters above, behind, below, in front of, or adjacent to second electronic device 116. In some embodiments, first electronic device 104 and second electronic device 116 have shared cloud storage, which is optionally distinct from storage device 112, or a shared user account. Wireless transmission may include using the shared cloud storage or the shared user account to transmit keys between first electronic device 104 and the second electronic device 116. In some embodiments, public encryption key 216 associated with the first electronic device 104 and/or private encryption key 220 associated with the first electronic device 104 are transmitted using wired transmission.

In some embodiments, encrypted prescription data 204 and/or calibration data 228 is decrypted at the first electronic device 104. In some embodiments, a user scans the label using first electronic device 104 to retrieve encrypted prescription data 204 and/or calibration data 228 from storage device 112. First electronic device 104 may use private encryption key 220 to decrypt encrypted prescription data 204 and/or calibration data 228. First electronic device 104 can transmit the decrypted prescription data 204 and/or calibration data 228 using any method as discussed above to second electronic device 116.

Optical system 240 of second electronic device 116 may utilize the extracted and/or decrypted prescription data 204 and/or calibration data 228 to setup and/or calibrate the second electronic device 116 with the inserted prescription lens. Prescription data 204 and/or calibration data 228 can include, but is not limited to, diopters of correction for nearsightedness or farsightedness in the left eye and/or right eye, and can include diopters of correcting for astigmatism in the left eye and/or right eye, and the axis (in degrees) representing the orientation of the astigmatism in the left eye and/or right eye. A calibration process using the calibration data 228 in optical system 240 optionally includes causing the prescription lenses to be illuminated by light sources (e.g., a plurality of LEDs) within the optical system. These light sources can cause specular reflections or "glints" to appear on the surfaces of the prescription lens. A plurality of cameras or other sensors or imaging devices within the optical system can capture these glints, and the optical system can compute the centroids of these glints and save them as feature points of the prescription lens. In some embodiments, the prescription lens modeling algorithm utilizes the generated intrinsic information for the prescription lenses to analyze and interpret the computed feature points and determine an estimated pose of the prescription lens, which is extrinsic information indicative of how the prescription lenses are attached to the optical system. At the conclusion of the calibration process, a snapshot including the intrinsic information (estimated surface profile data) and the extrinsic information (the estimated pose) of the prescription lens can be captured.

Figure 3:
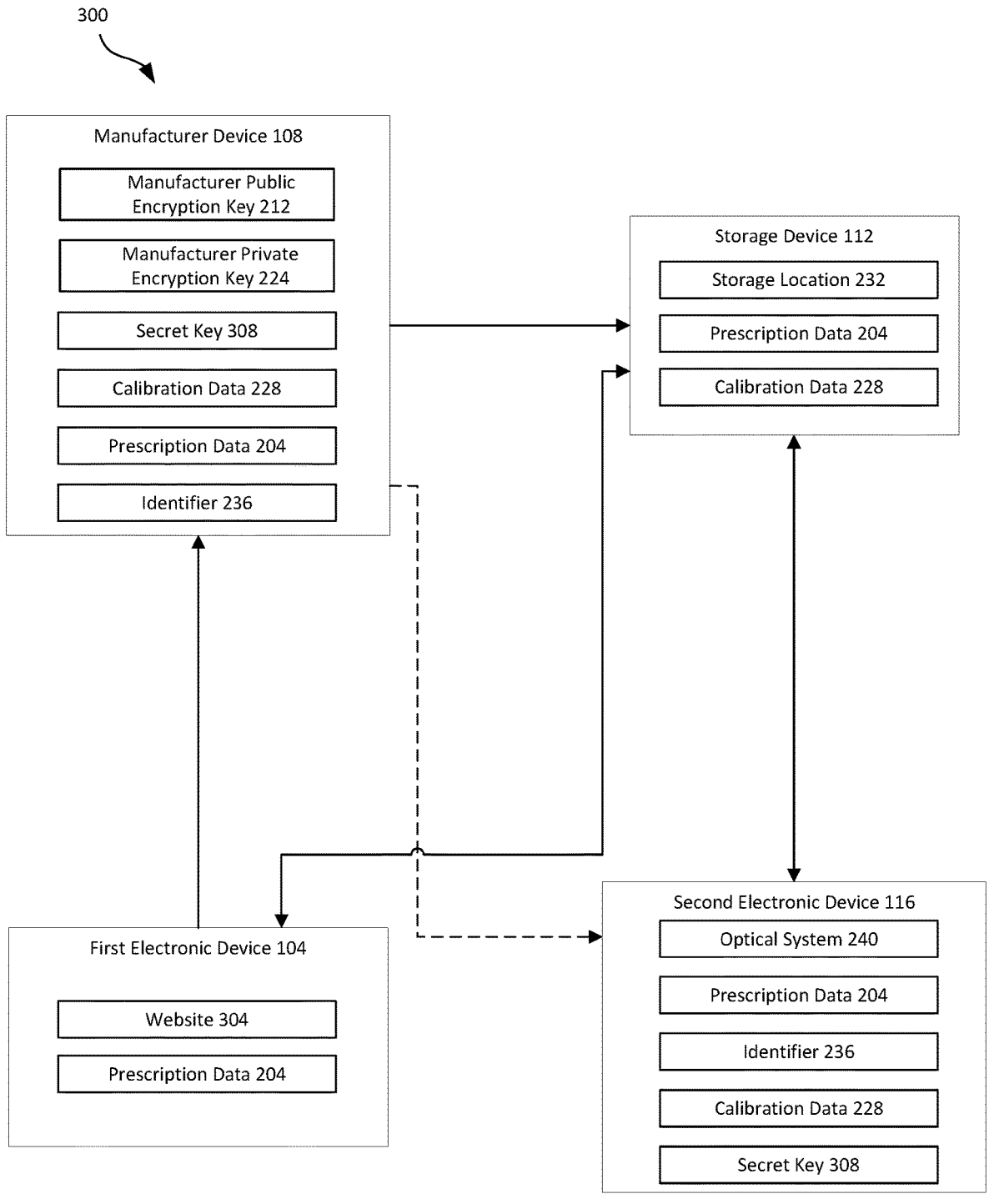
FIG. 3 illustrates an alternate exemplary flow diagram for a system for encrypting and securely transferring data according to some embodiments of the disclosure.

Now referencing FIG. 3, an exemplary alternate flow diagram 300 for a system for encrypting and securely transferring prescription lens data according to some embodiments of the disclosure. The embodiment of FIG. 3 shares some similarities to the embodiment of FIG. 2, which are not repeated for brevity, but has some notable differences. As an example, in the embodiment of FIG. 3, the first electronic device 104 does not generate an encryption key pair (e.g., public encryption key 216, private encryption key 220), the first electronic device does not transmit the a public encryption key 216, the manufacturer device 108 does not use the public encryption key 216 associated with the first electronic device 104 to encrypt the data, and the decryption of the prescription data 204 and/or calibration data 228 is not achieved using the private encryption key 220 associated with the first electronic device. Instead, the manufacturer device 108 may generate a secret key 308 (also referred to as a secret encryption key) to be used to encrypt and decrypt prescription data 204 and/or calibration data 228. For example, the encryption and decryption methods used in the embodiment of FIG. 3 is optionally symmetric, wherein the encryption key and the decryption key are the same. Possession of secret key 308 enables the holder of the secret key to encrypt or decrypt the encrypted data. In some embodiments, an encryption method used may include arranging the prescription and/or calibration data to be encrypted into matrices, and then modifying the matrices through one or more repeated permutations and arithmetic operations with a secret key. Because only one key (e.g., secret key 308) is needed to encrypt and decrypt data, secret key 308 may be kept secret and only shared with persons and/or entities that the user of the encryption function wishes to be able to decrypt the data (e.g., the encryption key can be provided from the lens manufacturer to the user without providing the encryption key to the storage device 112 and/or to the device manufacturer of the first electronic device 104 and/or second electronic devices 116).

In some embodiments, manufacturer device 108 generates an encryption key pair including a public encryption key and a private encryption key associated with the lens manufacturer. Manufacturer device 108 may encrypt prescription data 204 and/or calibration data 228 using the public encryption key associated with the lens manufacturer, and the encrypted data can be transmitted to and stored at storage device 112. The lens manufacturer and/or manufacturer device 108 may transmit the private encryption key associated with the lens manufacturer to the user of the second electronic device 116 (or the first electronic device 104) using methods as described herein. The encrypted prescription data 204 and/or calibration data 228 may be decrypted using the private encryption key associated with the lens manufacturer at the second electronic device 116 or the first electronic device 104.

In some embodiments, first electronic device 104 in reference to FIG. 3 provides access to a website 304 configured to ordering a prescription lens. For example, website 304 optionally corresponds to a marketplace for ordering prescription lenses and/or the second electronic device with which the prescription lenses can be used. In some embodiments, in a similar manner as described with respect to application 208, but using website 304, the prescription information is encrypted using the manufactures public encryption key.

The second electronic device 116 retrieves the prescription data 204 and/or encrypted calibration data 228 in a similar manner as described in the embodiment of FIG. 2. For example, by scanning the label transmitted from manufacturer device 108 to second electronic device 116. In some embodiments, the label includes secret key 308 in addition to identifier 236 associated with the prescription lens. Identifier 236 and/or secret key 308 may be hashed to produce a hash value corresponding to the storage location 232 of the prescription data 204 and/or calibration data 228 (e.g., similar to the discussion with respect to FIG. 2, but using the secret key 308 instead of the public encryption key associated with the first electronic device). In some embodiments, the label includes the hash value corresponding to the storage location 232 of the calibration data and secret key 308.

Second electronic device 116 optionally decrypts the encrypted prescription data 204 and/or encrypted calibration data 228 in a similar manner as described in the embodiment of FIG. 2. For example, second electronic device 116 may decrypt the encrypted data using secret key 308 retrieved from the label. In some embodiments, first electronic device 104 retrieves the secret key 308, decrypts the encrypted data, and/or transmits the decrypted data to the second electronic device 116. Optical system 240 then utilizes the decrypted prescription data 204 and/or calibration data to perform a full calibration of the optical system including the inserted prescription lenses, which can provide for improved visual performance and accuracy of operations that utilize the optical system with prescription lenses.

FIG. 4 illustrates an example flowchart of a method 400 for encrypting and securely transferring data according to some embodiments of the disclosure. A first electronic device (e.g., first electronic device 104) can obtain a request to purchase a prescription lens (e.g., prescription lens 120) at 405 from a user. The request to purchase a prescription lens can contain prescription data (e.g., prescription data 204). The first electronic device may include a first public encryption key (e.g., public encryption key 216) and a first private encryption key (i.e., private encryption key 220) associated with the first electronic device. The prescription data can be encrypted with a public encryption key associated with a manufacturer of the prescription lens (e.g., public encryption key 212 associated with the lens manufacturer) at 410. The encrypted prescription data and the optionally encrypted first public encryption key is transmitted to a device of the lens manufacturer at 415. The lens manufacturer can decrypt the prescription data (e.g., using private encryption key 224) and manufacture prescription lenses in accordance with the prescription data. The lens manufacturer can also generate calibration data (e.g., calibration data 228) associated with the prescription lens and encrypt the calibration data using the first public encryption key. The manufacturer device (e.g., manufacturer device 108) can transmit the encrypted calibration data to a database (e.g., a database in storage device 112). A second electronic device (e.g., second electronic device 116) can obtain encrypted calibration data from the database and a second encryption key (e.g., private encryption key 220 associated with the first electronic device or secret key 308) at 420. At the second electronic device, the encrypted calibration data can be decrypted at 425 using the second encryption key. The second encryption key may be the first private encryption key, or a secret key generated by the manufacturer device. The decrypted calibration data may be used to calibrate the second electronic device. After calibration, a display of the second electronic device may present images, in accordance with the calibration data, through an optical path that includes the prescription lens, at 430.

Figure 5:
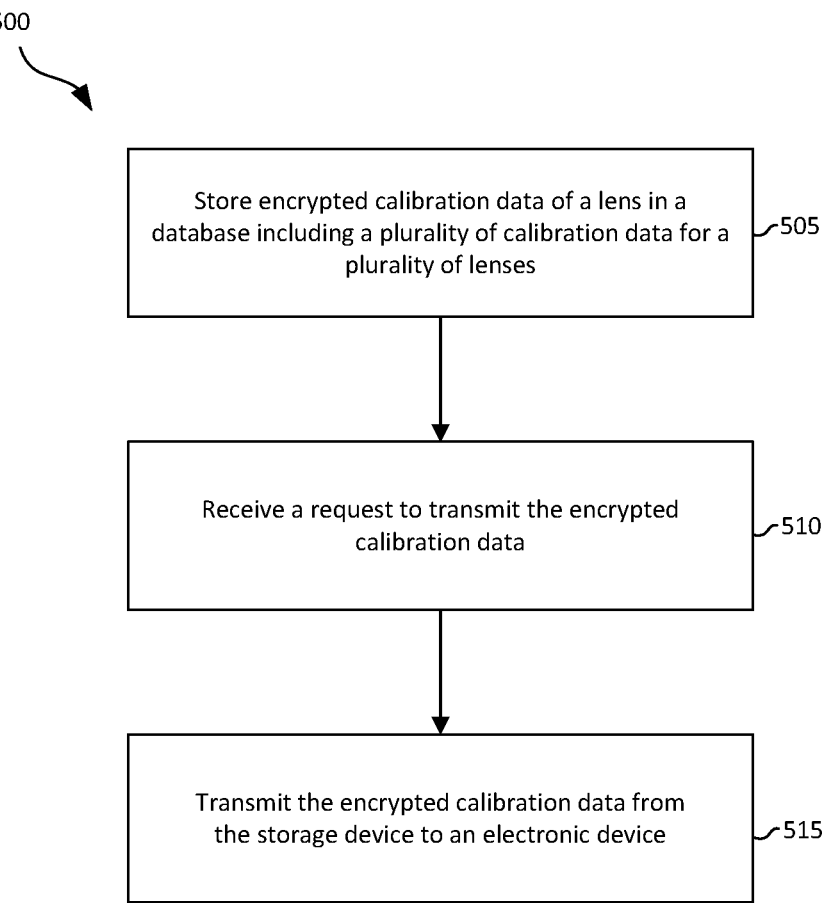
FIG. 5 illustrates an example flowchart of a method for storing and transmitting encrypted data according to some embodiments of the disclosure.

FIG. 5 illustrates an example flowchart of a method for storing and transmitting encrypted data according to some embodiments of the disclosure. In some embodiment, a storage device (e.g., storage device 112) includes a database. The database can store encrypted calibration data for a plurality of calibration data for a plurality of lenses at 505. The storage device can receive a request to transmit the encrypted calibration data at 510 for one of the prescription lenses (e.g., a request including a storage location as described with reference to FIGS. 2-3). The encrypted calibration data can be transmitted from the storage device to an electronic device at 515 (e.g., in accordance with the request).

Figure 6:
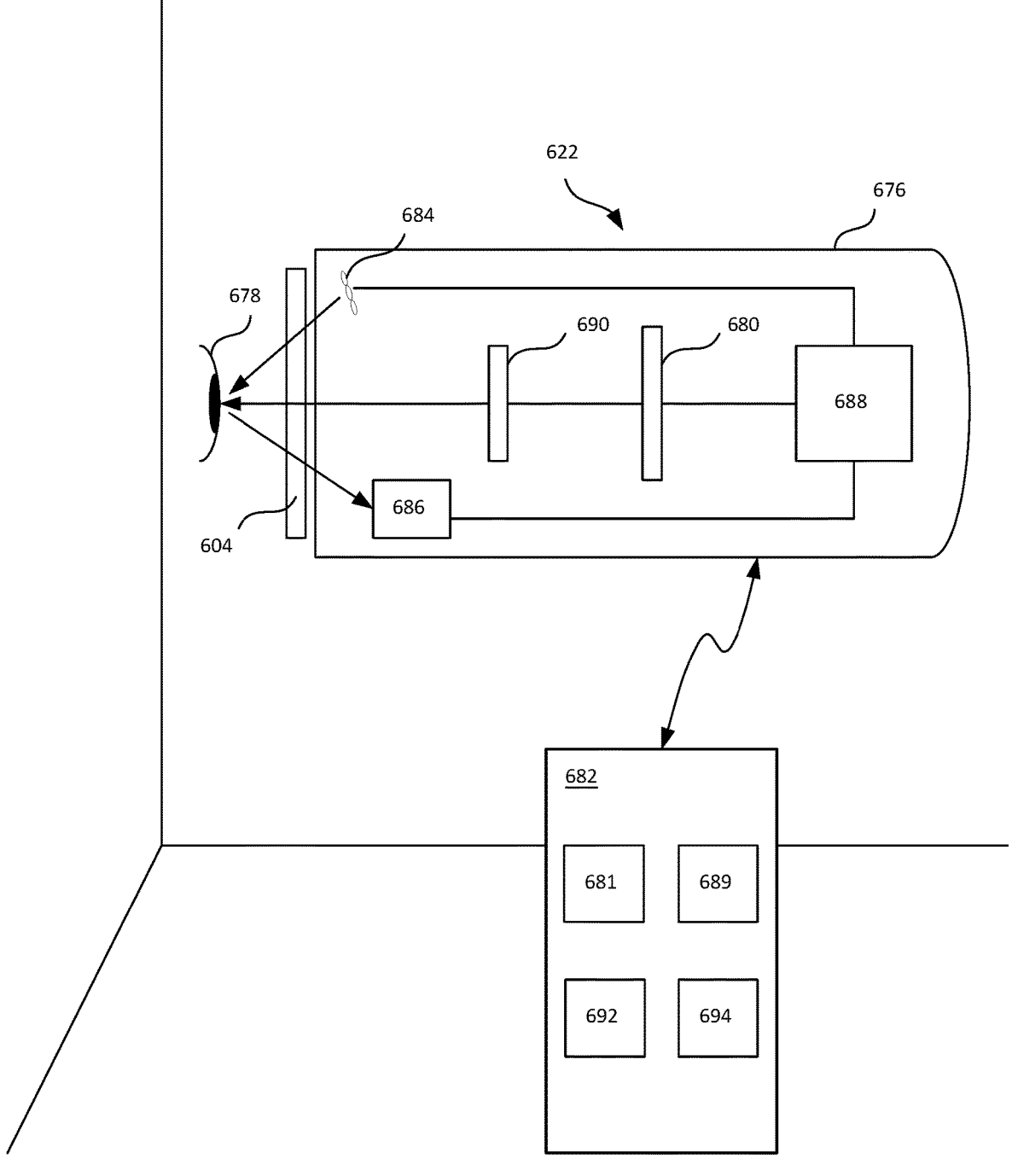
FIG. 6 illustrates a block diagram of an exemplary optical sensing system according to some embodiments of the disclosure.

FIG. 6 illustrates a block diagram of an exemplary optical sensing system 622 according to some embodiments of the disclosure. The optical sensing system 622 can include a housing 676 (or enclosure) that contains various components and can be in communication with an electronic device. In some embodiments, the optical sensing system 622 is optionally a head-mounted device and the housing 676 can be configured to rest against a face of a user 678 to keep the optical sensing system 622 in a relatively fixed position on the face of the user 678 (e.g., surrounding the eyes of the user 678). In other embodiments, the optical sensing system 622 is optionally glasses, goggles, a visor, a mask, a helmet, or other head-mounted device. The housing 676 can include a display 680 that displays an image, emitting light towards or onto the eye of the user 678. In various embodiments, the display 680 emits the light through an eyepiece having one or more lenses 690 that refracts the light emitted by the display 680, making the display appear to the user 678 to be at a virtual distance farther than the actual distance from the eye to the display 680. To enable user focus on the display 680, in various embodiments the virtual distance can be at least greater than a minimum focal distance of the eye (e.g., 7 cm). Further, to provide a better user experience, in some embodiments, the virtual distance is greater than 1 meter.

The housing 676 can also contain a tracking system including one or more light sources 684, image sensor 686, and a controller 688. The controller 688 can include one or more processing components (e.g., a CPU or a DSP) for processing various functions for the optical sensing system 622. The one or more light sources 684 can emit light onto the eye of the user 678 that reflects as a light pattern (e.g., one or more glints such as a circle) that can be detected by the image sensor 686 (e.g., camera). Based on the light pattern, the controller 688 can determine the presence of a lens and/or characteristics of the lens (e.g., prescription). In some embodiments, the one or more light sources 684 can emit light onto the eye of the user to illuminate the eye, and images of the eye can be processed by controller 688 to determine an eye tracking characteristic of the user 678. For example, the controller 688 can determine a gaze direction of one or both eyes of the user 678. In another example, the controller 688 can determine a blinking state (eyes open or eyes closed) of the user 678. Yet another example, the controller 688 can determine saccadic movements, a pupil center, a pupil size, or a point of regard. In some embodiments, the light from the eye of the user 678 can be reflected off a mirror or passed through optics such as lenses or an eyepiece before reaching the image sensor 686.

In some embodiments, the display 680 emits light in a first wavelength range, the one or more light sources 684 can emit light in a second wavelength range, and the image sensor 686 can detect light in the second wavelength range. In some embodiments, the first wavelength range is a visible wavelength range (e.g., a wavelength range within the visible spectrum of approximately 400-700 nm), and the second wavelength range can be a near-infrared wavelength range (e.g., a wavelength range within the near-infrared spectrum of approximately 700-1400 nm), or any other wavelength range outside of the visible light wavelength range. In some embodiments, the light source 684 and the image sensor 686 uses overlapping wavelengths when illuminating the eye for eye/gaze tracking. Alternatively, the light source 684 and the image sensor 686 can use the same spectrum to illuminate the eye for eye/gaze tracking while the user 678 is looking at the display 680 showing content within the visible spectrum.

As shown in FIG. 6, a lens 604 can be removably or permanently attached to the optical sensing system 622. In some embodiments, the lens 604 is attached using the housing 676 of the optical sensing system 622. Lens 604 can include any suitable transparent lens for altering a perception of images appearing on the display 680 as seen by the user's eyes. For instance, lens 604 can be a prescription lens that has a diopter, e.g., prescription, for correcting the user's vision. In such configurations, the lens 604 can help the user 678 see images appearing on the display 680 with improved clarity and sharpness. However, for the optical sensing system 622 to accurately provide content for the user 678, the optical sensing system 622 may need to know the prescription of (or other information about) the lens 604. One way for the optical sensing system 622 to access information about the lens 604 is to detect reflections of light generated at the one or more light sources 684 caused by a first surface (e.g., front surface) and/or a second surface (e.g., back surface) of the lens 604. In some embodiments, the reflections of the one or more light sources 684 caused by the lens 604 is detected using a sensor in the optical sensing system 622 such as the image sensor 686. For example, the reflections of the one or more light sources 684 caused by lens surfaces can be captured by the image sensor 686, and the information contained therein can be decoded by the controller 688 and used to modify operations of the optical sensing system 622.

In some embodiments, the light sources 684 generates light that reflects off the front surface and/or the back surface of the lens 604. The light sources 684 can be light emitting diodes (LEDs) or any other suitable light emitting source. In some embodiments, a pattern of reflections off the lens is detected in one or more images taken by the image sensor 686 when the eye tracking functionality is not being used. In one embodiment, the pattern of reflections off the lens can be detected when eye tracking is enabled, and content is displayed (or not displayed) in a specific area of the display 680.

In various embodiments, the image sensor 686 can be a frame/shutter-based camera that, at a particular point in time or multiple points in time at a particular frame rate, captures an image of the eye of the user 678. Each image can include a matrix of pixel values corresponding to locations of a matrix of light sensors of the camera.

In some embodiments, the image sensor 686 has a single field of view (FOV) that is used for both eye tracking functionality and detection of lens characteristics of the lens 604. In other embodiments, the image sensor 686 can have multiple FOVs with differing parameters such as size, magnification, or orientation with respect to the lens 604. The image sensor can have a first FOV used for eye tracking and a second, different FOV used for detection of the lens characteristics of the lens 604.

In some embodiments, the optical sensing system 622 is communicatively coupled to device 682, which can be a smart phone, a tablet computer, a laptop computer, or any other suitable portable or non-portable electronic device that is separate from the optical sensing system 622. For example, device 682 and optical sensing system 622 can each include communication circuitry (e.g., wireless communication circuitry) to enable communication therebetween. However, in other embodiments, the functionality of device 682 and optical sensing system 622 is integrated into a single electronic device.

In some embodiments, device 682 includes one or more display generation components such as display 681, one or more processors 689, one or more memories 692, one or more input devices 694 (e.g., touch sensor panels, trackpads, buttons, joysticks, microphones, etc.), and other components (e.g., wired or wireless communication circuitry, output devices such as speakers, tactile feedback generators, etc.). One or more communication buses not shown in FIG. 6 can optionally be used for communication between the afore-mentioned components within device 682.

In some embodiments, processors 689 include one or more general purpose processors, one or more graphics processors, and/or one or more digital signal processors (DSPs) for performing the operations described herein. In some embodiments, memory 692 is a non-transitory com-puter-readable storage medium (e.g., flash memory, random access memory, or other volatile or non-volatile memory or storage) that stores computer-readable instructions config-ured to be executed by processors 689 to perform the techniques, processes, and/or methods described herein. In some embodiments, memory 692 includes a non-transitory computer-readable storage medium.

In some embodiments, display 681 includes a single display (e.g., a liquid-crystal display (LCD), organic light-emitting diode (OLED), or other types of display). In some embodiments, display 681 can include multiple displays. In some embodiments, display 681 includes a display with a touch-sensitive surface (e.g., a touch screen), a projector, a holographic projector, a retinal projector, etc.

Figure 7:
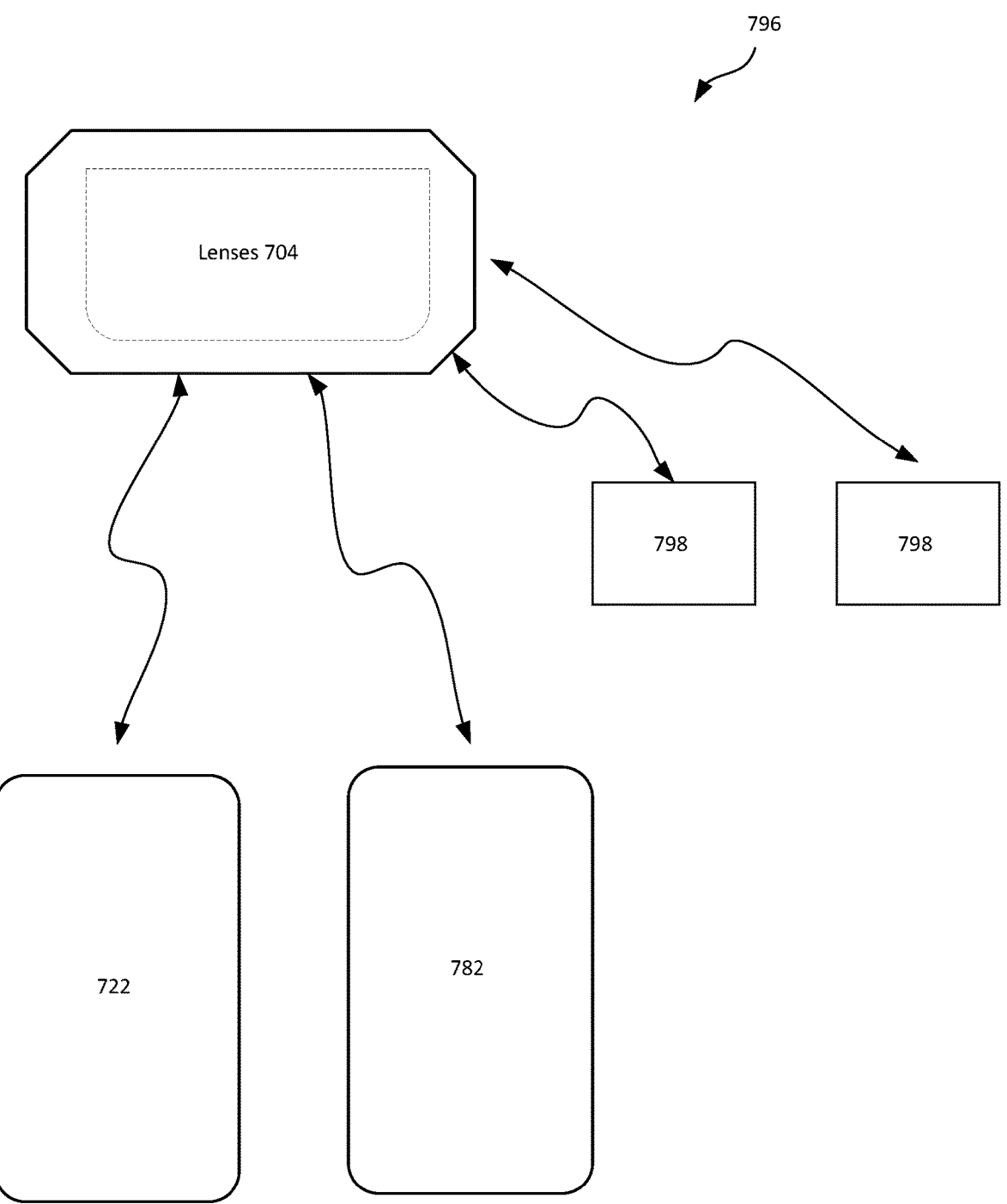
FIG. 7 illustrates an example symbolic hardware diagram of a system for calibrating an optical sensing system for prescription lenses according to some embodiments of the disclosure.

FIG. 7 illustrates an example symbolic hardware diagram of a system 796 for calibrating an optical sensing system 722 for prescription lenses according to some embodiments of the disclosure. In some embodiments, system 796 represents an electronic device that includes and is in communication with optical sensing system 722, which can be a wearable device such as glasses, goggles, a visor, a mask, a helmet, or other head-mounted device. In some embodiments, optical sensing system 722 is communicatively coupled to device 782, which can be a smart phone, a tablet computer, a laptop computer, an auxiliary device in communication with another device, a wearable host device, etc. In some embodi-ments, optical sensing system 722 is additionally or alter-natively communicatively coupled to one or more devices 798, which can be accessory devices such as a pointing device, handheld touch controllers, gloves, etc. In some embodiments, system 796 includes only a single optical sensing system 722 (and optional accessory devices 798), with the functionality of device 782 included in optical sensing system 722.

Therefore, according to the above, some embodiments of the disclosure are directed to a method comprising obtain-ing, at a first electronic device, a request to purchase a prescription lens configured to be inserted into a second electronic device, the request including prescription data for the prescription lens and a public encryption key associated with a manufacturer of the prescription lens, encrypting the prescription data with the public encryption key associated with the manufacturer of the prescription lens, transmitting the encrypted prescription data and a public encryption key associated with the first electronic device, wherein the prescription data is used by the manufacturer to manufacture the prescription lens, in accordance with an insertion of the prescription lens into the second electronic device, obtain-ing, at the second electronic device, calibration data asso-ciated with the prescription lens from a database and a second encryption key, wherein the calibration data stored by the database is encrypted with the public encryption key associated with the first electronic device, decrypting, using the second encryption key, the calibration data, and present-ing images, in accordance with the calibration data, using a display of the second electronic device through an optical path that includes the prescription lens. Additionally or alternatively to one of more of the embodiments disclosed above, in some embodiments, the method further includes generating an encryption key pair including the public encryption key associated with the first electronic device and a private encryption key associated with the first electronic device, wherein the second encryption key is the private encryption key. Additionally or alternatively to one of more of the embodiments disclosed above, in some embodiments, the method further includes requesting, at the second elec-tronic device, the calibration data associated with the pre-scription lens from the database including a plurality of calibration data for a plurality of lenses. Additionally or alternatively to one of more of the embodiments disclosed above, in some embodiments, obtaining the second encryp-tion key associated with the first electronic device further comprises wireless transmission of the second encryption key from the first electronic device to the second electronic device. Additionally or alternatively to one of more of the embodiments disclosed above, in some embodiments, the wireless transmission of the second encryption key to the second electronic device is in accordance with detecting contact between the first electronic device and the second electronic device or detecting the first electronic device within a threshold distance the second electronic device. Additionally or alternatively to one of more of the embodi-ments disclosed above, in some embodiments, the wireless transmission of the second encryption key to the second electronic device includes WiFi, Bluetooth, or near field communications. Additionally or alternatively to one of more of the embodiments disclosed above, in some embodi-ments, the method further includes calibrating an optical system of the second electronic device including the pre-scription lens in accordance with the calibration data of the prescription lens. Additionally or alternatively to one of more of the embodiments disclosed above, in some embodi-ments, further comprising encrypting the public encryption key associated with the first electronic device with the public encryption key associated with the manufacturer of the prescription lens. Additionally or alternatively to one of more of the embodiments disclosed above, in some embodi-ments, the method further includes requesting, by the second electronic device, the calibration data associated with the prescription lens, using a hash value based on an identifier (e.g., serial number) of the prescription lens. Additionally or alternatively to one of more of the embodiments disclosed above, in some embodiments, requesting, by the second electronic device, the calibration data association data asso-ciated with the prescription lens, includes using a hash value based the public encryption key of the first electronic device or a public encryption key of the second electronic device. Additionally or alternatively to one of more of the embodi-ments disclosed above, in some embodiments, the method further includes scanning a label to obtain a secret encryp-tion key associated with the manufacturer of the prescription lens using the second electronic device. Additionally or alternatively to one of more of the embodiments disclosed above, in some embodiments, the label includes an optical pattern representing computer-recognized code.

Some embodiments of the disclosure are directed to a non-transitory computer-readable storage medium storing instructions that, when executed by one or more processors of a system including a first electronic device and a second electronic device, causes the one or more processors to perform any method of one or more of the embodiments disclosed above. Some embodiments of the disclosure are directed to a non-transitory computer-readable storage medium storing instructions that, when executed by one or more processors included in a first electronic device, causes the one or more processors to perform portions of the methods of one or more of the embodiments disclosed above (e.g., those associated with the first electronic device). Some embodiments of the disclosure are directed to a non-transitory computer-readable storage medium storing instructions that, when executed by one or more processors included in a second electronic device, causes the one or more processors to perform portions of the methods (e.g., those associated with the second electronic device) of one or more of the embodiments disclosed above. Some embodiments of the disclosure are directed to a software including instructions that, when executed by one or more processors, causes the one or more processors to perform any method of one or more of the embodiments disclosed above.

Some embodiments of the disclosure are directed to an electronic device comprising a display, an optical system configured to receive a prescription lens, a memory, one or more processors, one or more programs stored in the memory and configured to be executed by the one or more processors, the one or more programs including instructions for: in accordance with an insertion of the prescription lens into the electronic device, obtaining calibration data from a database, wherein the calibration data stored by the database is encrypted using a private encryption key associated with a second electronic device, decrypting, using the private encryption key, the calibration data, and presenting images in accordance with the calibration data using the display of the electronic device through the optical system including through an optical path of the prescription lens. Additionally or alternatively to one of more of the embodiments disclosed above, in some embodiments, the device further comprises a camera configured to obtain an identifier associated with the prescription lens. Additionally or alternatively to one of more of the embodiments disclosed above, in some embodiments, the private encryption key associated with the second electronic device is transferrable between devices originating from the same company. Additionally or alternatively to one of more of the embodiments disclosed above, in some embodiments, the device further comprises obtaining an identifier associated with the prescription lens and the private encryption key associated with the second electronic device, wherein requesting the calibration data associated with the prescription lens includes determining a storage location of the calibration data using the identifier associated with the prescription lens and a hash. Additionally or alternatively to one of more of the embodiments disclosed above, in some embodiments, the device further comprises requesting, at the second electronic device, the calibration data associated with the prescription lens from the database including a plurality of calibration data for a plurality of lenses. Some embodiments of the disclosure are directed to a non-transitory computer-readable storage medium storing instructions that, when executed by one or more processors included the electronic device, causes the one or more processors to perform the method of one or more of the embodiments disclosed above.

Some embodiments of the disclosure are directed to a method comprising storing, at a storage device, encrypted calibration data of a prescription lens in a database including a plurality of calibration data for a plurality of lenses, receiving a request to transmit the encrypted calibration data, and transmitting the encrypted calibration data from the storage device to an electronic device configured to receive the prescription lens and to calibrate an optical sensing system of the electronic device in accordance with the calibration data. Additionally or alternatively to one of more of the embodiments disclosed above, in some embodiments, storing encrypted calibration data further comprises storing at a storage location at the storage device determined using an identifier associated with the prescription lens. Additionally or alternatively to one of more of the embodiments disclosed above, in some embodiments, identifier associated with the prescription lens is not stored or received by the storage device. Additionally or alternatively to one of more of the embodiments disclosed above, in some embodiments, the storage device is associated with a manufacturer of the electronic device. Additionally or alternatively to one of more of the embodiments disclosed above, in some embodiments, the method further comprises decrypting the encrypted calibration data using an encryption key associated with a manufacturer of the prescription lens or a user of the electronic device. Additionally or alternatively to one of more of the embodiments disclosed above, in some embodiments, the storage location may further be determined using an encryption key associated with a manufacturer of the prescription lens, wherein the encryption key is not stored or received by the storage device. Additionally or alternatively to one of more of the embodiments disclosed above, in some embodiments, the method further comprises receiving the encrypted calibration data of the prescription lens at the storage device from a manufacturer of the prescription lens. Additionally or alternatively to one of more of the embodiments disclosed above, in some embodiments, the method further comprises receiving a storage location from which to transmit the encrypted calibration data from the electronic device. Some embodiments of the disclosure are directed to a non-transitory computer-readable storage medium storing instructions that, when executed by one or more processors included in the storage device, causes the one or more processors to perform the method of one or more of the embodiments disclosed above.

Some embodiments of the disclosure are directed to electronic device comprising a display, an optical system configured to receive a prescription lens, a memory, one or more processors, one or more programs stored in the memory and configured to be executed by the one or more processors, the one or more programs including instructions for: obtaining an identifier associated with the prescription lens and an encryption key associated with the prescription lens, associated with the electronic device, or associated with a user of the electronic device, requesting calibration data associated with the prescription lens from a database including a plurality of calibration data for a plurality of lenses using the identifier, in accordance with an insertion of the prescription lens into the electronic device; obtaining the calibration data from the database, wherein the calibration data stored by the database is encrypted, decrypting, using the encryption key, the calibration data, and presenting images in accordance with the calibration data using the display of the electronic device through the optical system including through an optical path of the prescription lens. Some embodiments of the disclosure are directed to a non-transitory computer-readable storage medium storing instructions that, when executed by one or more processors included in the electronic device, causes the one or more processors to perform the method of one or more of the embodiments disclosed above.

The invention claimed is:

1. A method comprising:

obtaining, at a first electronic device a request to purchase a prescription lens configured to be inserted into a second electronic device, the request including prescription data for the prescription lens and a public encryption key associated with a manufacturer of the prescription lens;

encrypting the prescription data with the public encryption key associated with the manufacturer of the prescription lens;

transmitting the encrypted prescription data and a public encryption key associated with the first electronic device, wherein the prescription data is used by the manufacturer to manufacture the prescription lens;

in accordance with an insertion of the prescription lens into the second electronic device, obtaining, at the second electronic device, calibration data associated with the prescription lens from a database and a second encryption key, wherein the calibration data stored by the database is encrypted with the public encryption key associated with the first electronic device;

decrypting, using the second encryption key, the calibration data; and presenting images, in accordance with the calibration data, using a display of the second electronic device through an optical path that includes the prescription lens.

2. The method of claim 1, further comprising generating an encryption key pair including the public encryption key associated with the first electronic device and a private encryption key associated with the first electronic device, wherein the second encryption key is the private encryption key.

3. The method of claim 1, further comprising requesting, at the second electronic device, the calibration data associated with the prescription lens from the database including a plurality of calibration data for a plurality of lenses.

4. The method of claim 1, wherein obtaining the second encryption key associated with the first electronic device further comprises wireless transmission of the second encryption key from the first electronic device to the second electronic device.

5. The method of claim 4, wherein the wireless transmission of the second encryption key to the second electronic device is in accordance with detecting contact between the first electronic device and the second electronic device or detecting the first electronic device within a threshold distance from the second electronic device.

6. The method of claim 4, wherein the wireless transmission of the second encryption key to the second electronic device includes WiFi, Bluetooth, or near field communications.

7. The method of claim 1, further comprising calibrating an optical system of the second electronic device including the prescription lens in accordance with the calibration data of the prescription lens.

8. The method of claim 1, further comprising encrypting the public encryption key associated with the first electronic device with the public encryption key associated with the manufacturer of the prescription lens.

9. The method of claim 1, further comprising:

requesting, by the second electronic device, the calibration data associated with the prescription lens, using a hash value based on an identifier of the prescription lens.

10. The method of claim 1, further comprising:

requesting, by the second electronic device, the calibration data associated with the prescription lens, using a hash value based on the public encryption key associated with the first electronic device or a public encryption key associated with the second electronic device.

11. The method of claim 1, further comprising:

scanning a label to obtain a secret encryption key associated with the manufacturer of the prescription lens using the second electronic device.

12. The method of claim 11, wherein the label includes an optical pattern representing computer-recognized code.

13. An electronic device comprising:

a display; a physical optical system configured to receive a prescription lens in response to prescription data transmitted from a second electronic device to a manufacturer; a memory; one or more processors; one or more programs stored in the memory and configured to be executed by the one or more processors, the one or more programs including instructions for:

in accordance with an insertion of the prescription lens into the electronic device, obtaining calibration data from a database, wherein the calibration data is generated by the manufacturer of the prescription lens, wherein the calibration data stored by the database is encrypted using a private encryption key associated with the second electronic device;

decrypting, using the private encryption key, the calibration data; and presenting images in accordance with the calibration data using the display of the electronic device through the physical optical system including through an optical path of the prescription lens.

14. The electronic device of claim 13, further comprising a camera configured to obtain an identifier associated with the prescription lens.

15. The electronic device of claim 13, wherein the private encryption key associated with the second electronic device is transferrable between devices originating from a same company.

16. The electronic device of claim 13, further comprising: obtaining an identifier associated with the prescription lens and the private encryption key associated with the second electronic device; wherein obtaining the calibration data associated with the prescription lens includes determining a storage location of the calibration data using the identifier associated with the prescription lens and a hash.

17. The electronic device of claim 13, further comprising requesting, at the second electronic device, the calibration data associated with the prescription lens from the database including a plurality of calibration data for a plurality of lenses.

18. An electronic device comprising:

a display; a physical optical system configured to receive a prescription lens in response to prescription data transmitted from a second electronic device to a manufacturer; a memory; one or more processors; one or more programs stored in the memory and configured to be executed by the one or more processors, the one or more programs including instructions for:

obtaining an identifier associated with the prescription lens and an encryption key associated with the prescription lens, associated with the electronic device, or associated with a user of the electronic device;

requesting calibration data associated with the prescription lens from a database including a plurality of calibration data for a plurality of lenses using the identifier, wherein the calibration data is generated by the manufacturer of the prescription lens;

in accordance with an insertion of the prescription lens into the electronic device, obtaining the calibration data from the database, wherein the calibration data stored by the database is encrypted;

decrypting, using the encryption key, the calibration data; and presenting images in accordance with the calibration data using the display of the electronic device through the physical optical system including through an optical path of the prescription lens.

19. The electronic device of claim 18, the one or more programs further including instructions for:

generating an encryption key pair including a public encryption key associated with the electronic device and a private encryption key associated with the electronic device.

20. The electronic device of claim 18, the one or more programs further including instructions for: calibrating the physical optical system of the electronic device including the prescription lens in accordance with the calibration data of the prescription lens.

* * * * *